(No Model.) 2 Sheets—Sheet 2.
C. E. EMERY.
COMPENSATION PENDULUM.
No. 436,343. Patented Sept. 16, 1890.
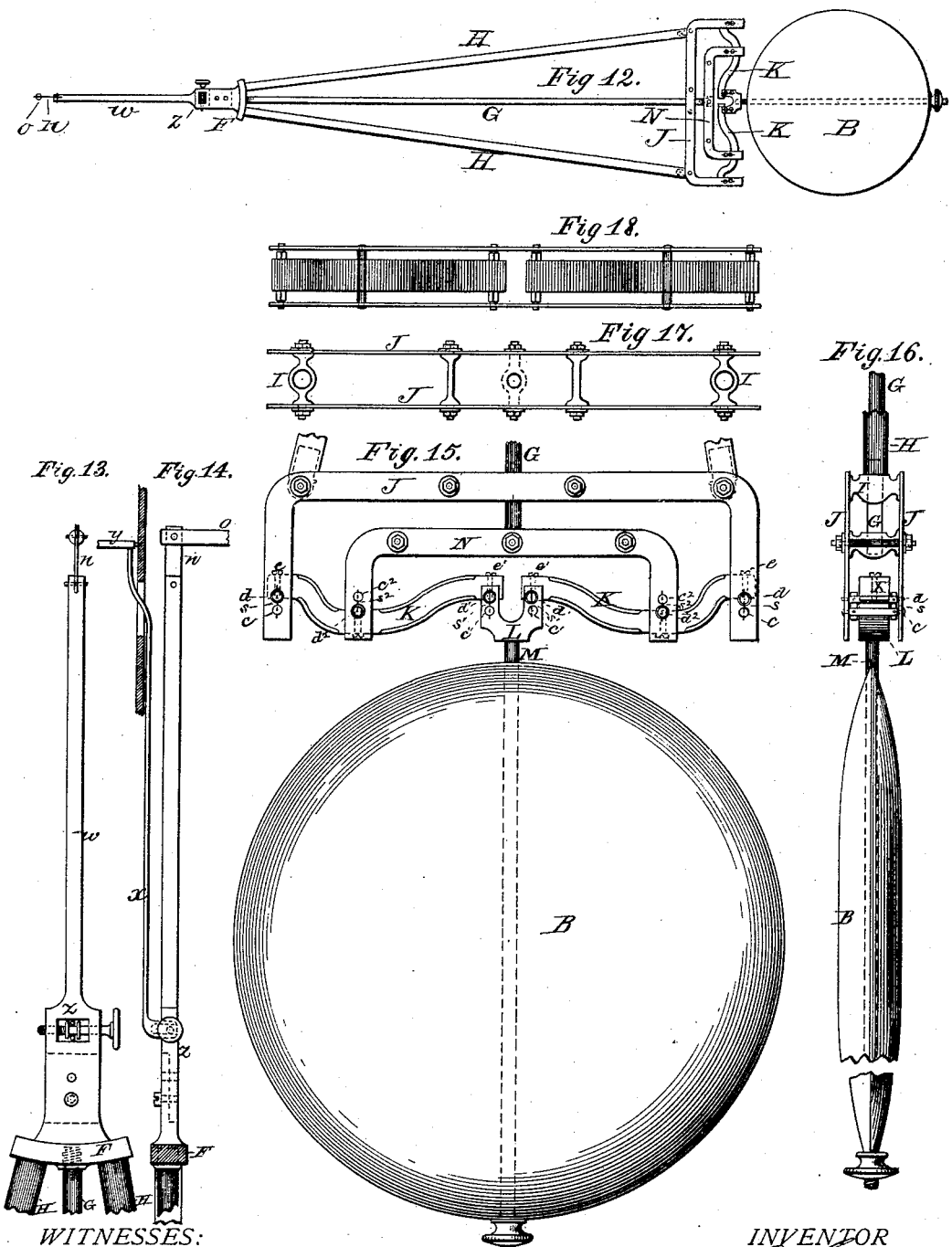
WITNESSES:
H. J. Spyker
George C. Pennell
INVENTOR
Chas. E. Emery

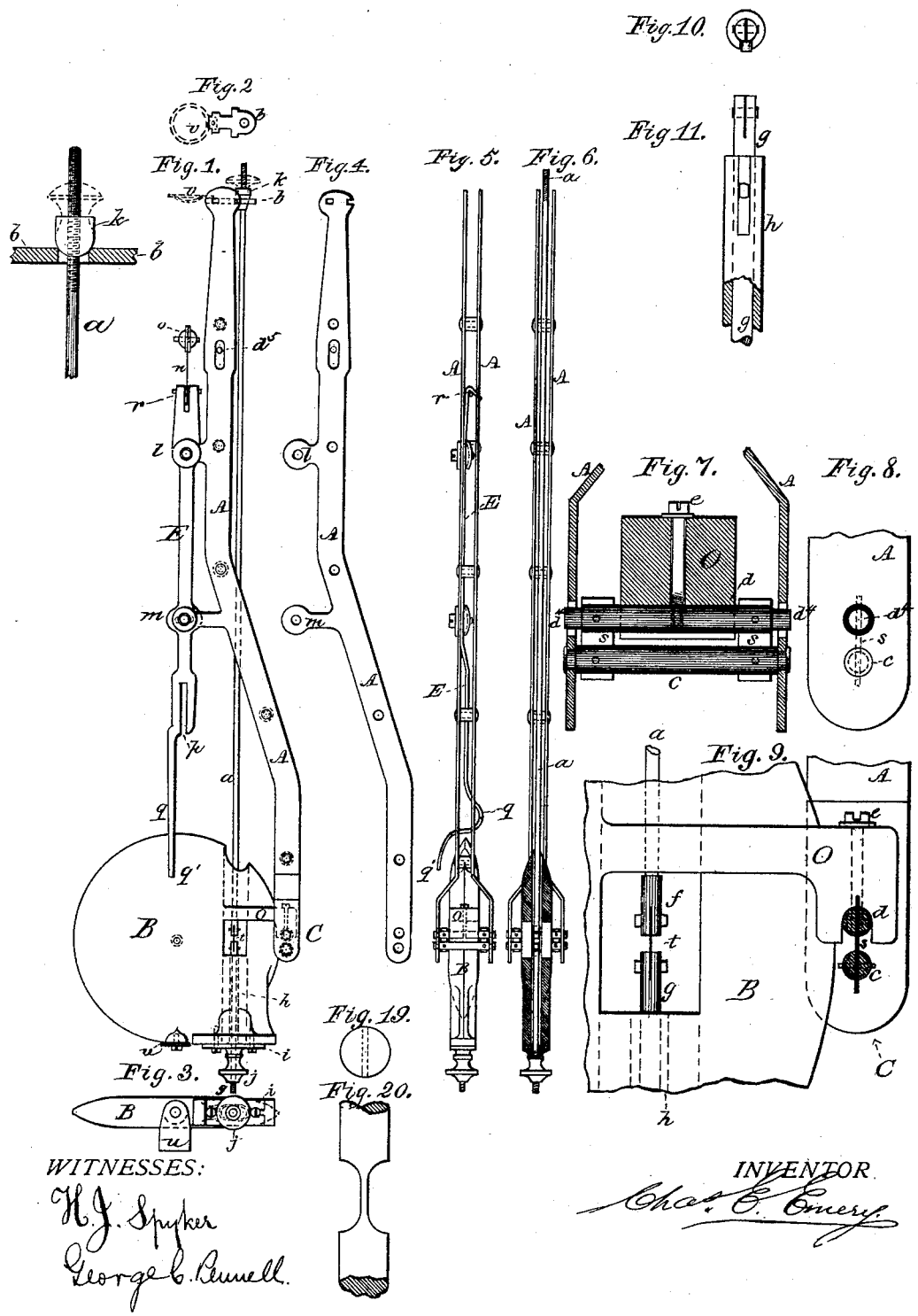

UNITED STATES PATENT OFFICE.

CHARLES E. EMERY, OF BROOKLYN, NEW YORK.

COMPENSATION-PENDULUM.

SPECIFICATION forming part of Letters Patent No. 436,343, dated September 16, 1890.

Application filed September 24, 1889. Serial No. 324,906. (No model.)

*To all whom it may concern:*

Be it known that I, CHARLES E. EMERY, of Brooklyn, Kings county, New York, (office New York city,) have invented certain new and useful Improvements in Compensated Pendulums; and I do hereby declare that the following is a full, clear, and exact description of the same, reference being had to the accompanying drawings, making part of this specification.

These improvements relate to that class of pendulums in which the compensation is secured by the use of a compound rod made of materials with different degrees of expansibility by heat connected to the ball by a lever or system of levers. In the ordinary construction of such pendulums pivots and journals are required, which, however well constructed, have some slight friction, which interferes more or less with the prompt movement required to secure accurate compensation for small changes of temperature. In such case motion takes place with a minute jump after the difference of temperature has become sufficiently great to overcome the friction. The best of such pendulums may acquire a gaining rate of several seconds a day after a change of temperature sufficient to change the compensation, when, if the temperature remains uniform within a few degrees, such gaining rate will be maintained till a sufficient fall of temperature occurs to again change the compensation, when, if again the temperature remains constant within a few degrees, the clock will have a losing rate until another considerable change takes place.

My invention consists, in general terms, of the combination, with the various parts of a pendulum of the kind above described, of metal spring-joints for the levers, whereby friction, in the ordinary sense of the term, is absolutely prevented; and it consists, further, of various details necessarily employed to construct such a pendulum so that it will be certain in its action, retain its rate permanently, and can be transported without injury.

In the drawings, Figure 1 is an exterior side view of a half-seconds pendulum embodying the distinguishing features of the invention. Fig. 2 is a top view of the bridge-piece connecting the upper portions of the rod. Fig. 3 is a bottom view of the pendulum-ball. Fig. 4 is a side view of one of the plates forming the body of the rod. Fig. 5 is an outside view of the principal portion of the right-hand side of the pendulum as shown in Fig. 1, some parts being omitted to avoid confusion. Fig. 6 is a similar view of the left-hand side of the top of the pendulum, and at the bottom shows a section on the center line of the rod $a$, Fig. 1, looking from the left. Fig. 7 is an enlarged section through the center line of the lower part of the main frame A. Fig. 8 is an enlarged side view of the lower part of the side frame A. Fig. 9 is an enlarged side view of a portion of the main ball B of the pendulum, showing the main fulcrum-hinges in section. Fig. 10 is an enlarged plan view, and Fig. 11 an enlarged side view, of the upper end of adjusting-rod $g$ and supporting-tube $h$. Fig. 12 is a general front view of a construction with double levers adapted for a full-seconds pendulum. Fig. 13 is an enlarged front view of the upper portion of said pendulum. Fig. 14 is an enlarged side view of the same. Fig. 15 is an enlarged front view of the lower portion of the pendulum. Fig. 16 is an enlarged side view of the same. Fig. 17 is an enlarged top view of the upper connecting-yoke in Fig. 15. Fig. 18 is an enlarged top view of the levers in Fig. 15, showing also the general position of the yoke above referred to, with some details omitted. Figs. 19 and 20 show a plan and elevation of a rod thinned for a short distance to form a spring.

In both forms of construction B is the ball of the pendulum. In the half-second type (shown in Fig. 1) this ball is preferably cast in such form and constructed with such details that it forms the lever in itself. In the full-second type, Fig. 12, the ball is merely suspended from the adjusting-levers. In the half-second type the main rod A, Figs. 1, 4, and 5, is made up of two plates or members of a material with a high degree of expansibility by heat, usually brass, which plates are secured together by pillars to form a frame, the plates being offset outwardly at the bottom to receive the joint mechanism of the fulcrum, yet to be described, and connected together at the top with a cross-piece $b$, arranged to support the upper end of a rod $a$, which should be constructed of a material of less degree of expansibility by heat than the main rod A—iron, for instance—which rod connects at the bottom to the main pendulum-ball B, at a point between the fulcrum C and the center of the ball, by means of a spring-joint, yet to be described, so that there is formed in the ball itself a lever. The ball being supported between its center and the fulcrum by the rod $a$ of low expansibility, and the fulcrum held down at the outer edge of the ball by the rod A of greater expansibility, the effect is that as the temperature increases the main body of the rod A expands more than the central rod $a$, thereby carrying down the outer or fulcrum end C of the lever formed in the ball B, and lifting the center of the latter so as to compensate the pendulum for temperature, the reverse action taking place in cold.

The lower separated ends of the plates A A, forming the main body of the rod, are connected together rigidly by a pillar $c$, (shown most distinctly in Fig. 7,) which pillar in suitable slots receives near its ends, and preferably inside the plates A A, the lower ends of two thin springs $s$ $s$, secured by rivets, the upper ends of which springs are similarly secured in a bar $d$, resembling in appearance the pillar $c$, but reduced in diameter at its ends $d^4$, which extend loosely into holes in the main bars A A, the intention being that such reduced ends shall not touch the bars except under conditions of unusual strain or jar, when they will operate to prevent the springs $s$ $s$ from being bent sufficiently to become distorted or injured. The bar $d$ lies in a transverse groove in an arm O, formed upon the ball B of the pendulum, and is secured thereto by a screw $e$, the effect of the whole arrangement being that the ball being supported, in a way yet to be described, by a central rod $a$ between the center of the pendulum-ball and the fulcrum C, the weight of such ball concentrated near such center tends to lift the outer end at fulcrum C, and through the screw $e$ and bar $d$ brings tension upon the springs $s$ $s$, which is transmitted to the outer main bars A A of the rod through the pillar $c$. The upward strain thus produced is carried to the upper end of the plates A A, forming the main body of the rod, and the piece $b$ secured between such plates receives the upper end of the central rod $a$, which supports the ball at a point between the center of weight and the fulcrum, thereby completing the couple and attaching the ball B to the main body of the rod A. The lower end of the central rod $a$ is preferably secured in a socket $f$, Fig. 9, and receives in a suitable slot a spring $t$, the lower end of which is secured in a corresponding slot of an adjusting-rod $g$, Figs. 9 and 11, which enters a guide-tube $h$, (shown in dotted lines in Figs. 1 and 9,) secured to a plate $i$, Fig. 1, which rests on a suitable bearing formed near the bottom of the pendulum-ball B, and secured to the latter through slots in the plate by two screws, as shown. The lower end of the adjusting-rod $g$ is threaded and carries an adjusting-screw $j$, by operating which the center of the pendulum may be swung around the fulcrum C, thereby changing the relative lengths of the two elements of the compound bar, and at the same time altering the effective length of the pendulum and regulating the rate of the clock. The upper end of the rod $a$ is ordinarily threaded and provided with a nut, with its lower part hemispherical, or in the form of an inverted cone, which part enters a hole in the piece $b$, secured to and between the plates A A, near the tops of the same, which hole is of such size that the inclined sides of the base of the nut will rest on the edges of the hole and always be brought to a definite bearing. This is a very important improvement over the common method of arranging a pendulum-rod in a loose hole, and so that the nut on the same will bear on a surface not made accurately at right angles to the rod, whereby when the nut is turned slightly for close adjustments the effective length of pendulum may be varied more by change of position than by the movement on the thread, and perhaps the desired adjustment be doubled or even reversed in direction, or, at any rate, be in most cases unsatisfactory. With the conical or ball joint above shown the parts are always brought to a definite bearing, and even if the angle be slightly changed no variation in length will take place with a ball-joint and practically none with a cone-joint. When it is desired to regulate the clock from the top, the nut $k$ is made loose on the thread on central rod $a$ and provided with a large milled head. (Shown in dotted lines.) To prevent the rods $a$ and $g$ from turning, the tube $h$, as shown in Figs. 10 and 11, is provided with a slot—on one side at least—in which slides a pin secured in adjusting-rod $g$ at such an angle as to cause the spring $t$ to lie in a transverse direction.

One of the plates A of the main frame is constructed with two arms, with eyes $l$ and $m$, Fig. 4, at their ends, to which is secured by screws, nuts, and spring-washers, (shown in side view, Fig. 5,) a beat-arm E, which is provided at the top with a forked hook engaging with a pin secured to the lower portion of the pendulum suspending-spring $n$, which is secured at its upper end to a fixed stud $o$, forming part of or attached to a cock or frame in any customary manner. There is a slotted hole in the beat-arm E, opposite eye $m$, which permits the arm to be swung laterally upon a screw in upper eye $l$ as a fulcrum, but subject to the resistance of the spring-washers previously mentioned. The lower end of beat-arm E is provided with a slotted opening $p$, which receives the crutch-wire connected with the anchor-staff of the clock, the end of which is to be bent laterally for the purpose.

As shown in Fig. 5, the beat-arm E is bent so as to throw the hook $r$ and the portion provided with the slot $p$ on the center line of the pendulum. The lower portion of beat-arm E is extended down and bent in the form shown at $q$, which answers the double purpose of preventing the pendulum-ball B when being handled from rising an extreme distance, as its edge will come in contact with the bend $q$, and the portion $q'$ of the beat-arm extending over and in front of the pendulum-ball can be manipulated, when the pendulum is hung in position, to shift the beat-arm E, and with it the slot $p$ and crutch-wire engaging therewith, in relation to the main rod of the pendulum, so as to put the clock "in beat," the spring-washers on arms $l$ and $m$ serving to retain the beat-arm E in the position to which it may be moved. To the bottom of the pendulum-ball a small plate $u$ is attached to receive weights for close regulation, and at the top of the rod a cup $v$ is also secured to receive weights when it is desirable to make the regulation at the top. A small weight in cup $v$, located above the center of suspension to the relative extent shown, will slow the clock substantially the same as a similar weight laid upon the table $u$, at the bottom of the pendulum.

In Figs. 12, 13, and 14, $o$ is the cock, and $n$ the suspending-spring, the same as before. The upper portion of the rod $w$ connects to the spring either rigidly or with a hook, as in the other case, and is extended below the face of the clock and provided with any adequate means for engagement with and adjustment of the crutch-rod $x$, connected to anchor-staff $y$, so that the clock can be put in beat. One plan is shown arranged in the widened part $z$, which is provided with means for connection to the head F of the pendulum-rod. The lower part of this head is adapted for connection at the center to a rod G, of iron or other metal of low expansibility by heat, and at the sides connects to two rods or tubes H H, of brass or other material of high degree of expansibility, which tubes run down straight or inclined and connect to distance pieces or pillars I I, between a pair of plates J J, which plates bend down at their outer ends and receive pillars $c$ $c$, constructed like those shown in Figs. 7, 8, and 9, such pillars connecting to springs $s$ and to cross-bars $d$, the same as in the figures last-above mentioned, but the latter bars connecting to the outward ends of inwardly-turning bent levers K K, through screws $e$ $e$, and the inner ends of such levers being provided with a similar arrangement of grooves connected by screws $e'$ $e'$ to rods $d'$ $d'$, and through springs $s'$ $s'$ to pillars $c'$ $c'$, fixed rigidly between two plates forming the sides of a fork L, which is secured to suspending-rod M, carrying the pendulum-ball B.

At an intermediate position in the top of each of the levers K K, within the groove, is secured a bar $d^2$, like $d$, (shown in Fig. 7,) and this is connected to a pillar $c^2$ by a spring $s^2$. The pillars $s^2$ on either side are secured in the pendent arms of a frame N, secured together by a suitable number of pillars, which frame is through a central pillar secured to the lower end of the central rod G of low expansibility by heat. The result is the same as in the previous case. The intermediate pins of the levers sink less under high temperature than the fulcrums connected to metal of a higher degree of expansibility by heat, the effect of which is to raise the inner ends of the levers connected to the fork L, and with the latter the ball B, and thereby compensate for temperature. At each of the three sets of joints in the two levers K the springs are protected by causing the ends of the several bars $d$ $d'$ $d^2$ to extend loosely within openings in the side plates of the several frames J, L, and N, so that while the projecting ends are entirely free in the ordinary operation of the pendulum and the whole weight hangs on the springs, any jars due to handling or transportation will be transmitted by the ends of the bars directly to the frames themselves and the springs be protected from overstrain and injury.

Any arrangement of levers common in this class of pendulums may be employed instead of those shown in the two types herewith presented, so long as provision be made for the use of springs at the joints. The proportions of the pendulums are to be so adjusted that when the clock is running to mean time the center of the ball, Fig. 1, and the center of the springs $t$ and $s$ will be in the same horizontal line, or nearly so, and so that the centers of all the springs in the full-second type, Fig. 12, will be in the same horizontal line, or nearly so.

In Fig. 1 the amount of compensation for temperature can be adjusted by sliding the plate $i$ horizontally on the bearing provided for it and securing the same with the screws shown by pressure on washers covering the slotted holes. As the rod $a$ and its spring-joint $t$ is moved nearer and nearer the fulcrum C, the motion due to the difference in the expansion of the main plates A and the central rod $a$ is increased and the adjustment for temperature correspondingly increased. Adjustments can be made with the construction shown in Figs. 12 and 15 by providing similarly to shift the points of connection of the bars $d^2$ $d^2$ in frame N and levers K K, or by changing the lengths of the lever-arms in any customary way.

Evidently the general arrangement and many of the details of the pendulums herein described are equally applicable to other pendulums, and particularly to those compensated with levers articulated with ordinary joints.

It is not necessary that the spring-joints be actually made of a thin strip or lamina secured in slits, as shown in the drawings. It will answer in many cases to merely mill from the sides of a circular or square rod metal cavities of a semicircular or equivalent section, as shown in Figs. 19 and 20, leaving the metal or other material quite thin for a shorter or longer distance, so that all the flexure will take place at that point. This system is particularly well adapted for the intermediate joints in Figs. 1 and 9, as thereby the spring may be worked out of a single rod $fg$. There is no difficulty, also, in applying such springs instead of the plates $s$ at the fulcrum, in which case the rods of which they are formed would run through and be secured in the pillar $c$ and bar $d$.

It will be observed that springs of either form, when constructed so that each is practically integral with the parts to which it is attached, have an additional advantage, compared with ordinary joints, in securing the parts together so as to permit them to swing without slack motion. In an ordinary bearing, on account of the necessary slackness of the pivot or journal in the pivot-hole, the first motion of the pivot or journal is to slightly roll up the incline formed by the bottom of the hole or bearing, which rolling action necessarily produces a microscopic change of the length of parts connected by such bearings sufficient to change the rate of a delicate piece of apparatus like a pendulum, but which does not take place with the mechanism provided for herein.

The compensating bars operating the levers need not necessarily form part of the rod supporting the main pendulum-ball, and need not be arranged substantially in a vertical position, as shown. With this form of joint any arrangement may be employed which has been used in the construction of other pendulums—for instance, there may be a large ball supported by a rod and not compensated, and an arrangement, substantially similar to that shown attached thereto, to effect the compensation with an auxiliary ball, or compound bars operating to effect the compensation through levers may be merely attached, either in a vertical, horizontal, or other position, to the main rod, so long as by the difference in the expansion they secure compensation through joints of the kind herein described.

The extension of the frames A above the points of suspension accomplishes the double purpose of increasing the effective lengths of the compound compensating rods and of bringing the adjusting-screw $k$ and weight-table $v$ at such a point that they may be conveniently operated from the top in gallery-clocks or others, where the top is more accessible than the bottom.

It will be observed that the upper part of the frame A is slotted nearly opposite the flexing-point of the suspending-spring $n$ below the stud $o$, and within this slot is placed loosely a pin $d^5$, which is to be secured rigidly in the rear frame of the clock. This arrangement has the same effect as that of the projections $d^4$, which extend through openings in the frames A, Figs. 7 and 8, as the strain due to extreme lateral shake will be brought upon the pin $d^5$, and the frame, instead of distorting the spring $n$, and, in case the spring should break, the weight of the pendulum will come upon the pin $d^5$ without causing other injury.

It will be observed that when a clock is regulated from the top of the pendulum and the pendulum be started by hand from that point the pin $d^5$ will receive any unusual shock transmitted to the suspending-spring in such operation, though in the ordinary operation of the pendulum the frame will swing entirely clear of the pin.

What I claim as my invention, and desire to secure by Letters Patent, is—

1. In combination with the ball of a pendulum, and with compound bars and compensating levers, flexible strips or springs adapted to secure together the several parts without slack motion, but so as to permit slight swinging movements, substantially as and for the purposes specified.

2. In the construction of a pendulum provided with a compound rod composed of elements of different degrees of expansibility by heat, the combination of the elements of the rod with the ball of the pendulum through portions of such elements of reduced thickness so as to be flexible, substantially as and for the purposes specified.

3. Bars or rods of different degrees of expansibility by heat, provided with flexible or spring sections, in combination with the ball of a pendulum and a compensating lever or levers, substantially as and for the purposes specified.

4. In combination with a flexible strip or spring employed as a joint, one or more stop-pieces attached thereto, arranged in connection with the frame so as to resist shocks and strains at the joint after the spring is flexed safely a limited distance.

5. In combination, a joint provided with a flexible strip or spring arranged to swing freely a limited distance, and secondary journals or bearings adjusted in the frame so as to limit the motion of the spring.

6. A combined spring and articulated joint arranged and operating so that limited movements cause only flexure of the spring or lamina, and extreme movements and shocks are received by the articulations or bearings, substantially as described.

7. In combination, frames A A, pillar $c$, one or more springs $s$, and a swinging cross-bar $d$, provided with projections $d^4$, engaging loosely with openings in the frame, substantially as and for the purpose specified.

8. A pendulum-ball provided near the center with an integral lateral lug for the attachment of one member of a compound rod through a joint, and with suitable points of attachment to receive through a joint another member of a compound rod, thereby forming a lever in the construction of the ball itself, substantially as specified.

9. In combination with a pendulum-ball provided with lever-compensation and a compound bar operating the same, a guide-tube $h$, adjustable rod $g$, and adjustable nut $j$, adapted to change the relative lengths of the two elements of the compound bar to regulate the rate of the clock.

10. In a pendulum with compensating lever, an adjustable piece $i$, with guide-tube $h$, and adjusting-rod $g$, arranged to shift directly or indirectly through other parts one of the joints of the lever to or from the other joint, so as to change the leverage and thereby the rate of the compensation, substantially as and for the purpose specified.

11. In a pendulum, the rods $f$ and $g$, connected by a joint or flexible portion $t$, in combination with a shifting-plate $i$, substantially as and for the purpose specified.

12. In a pendulum, the rods $f$ and $g$, connected by a joint or flexible portion $t$, in combination with tube $h$, shifting-plate $i$, and adjusting-screw $j$.

13. In combination, rods $f$ and $g$, connected by a joint or flexible portion $t$, guide-tube $h$, and a pin and slot or equivalent to keep the spring or lamina in proper direction, substantially as and for the purpose specified.

14. A compound pendulum-rod in which the element of the greatest expansibility by heat is formed in the shape of a frame, with double plates secured together by pillars, as in clock construction, provided at one point with means of attachment to the arm of a compensating lever, at another point with means of attachment to the portion of the compound bar of least expansibility by heat, and at another with means of attachment to the supporting-spring, substantially as and for the purpose specified.

15. In combination, double plates A A, suitable pillars connecting the same, as in the construction of clock-movements, a piece $b$, also connecting the plates and provided with means to receive a central rod $a$, a lug for connection directly or indirectly with a suspending - spring, and means of attachment to a weighted lever.

16. A beat-arm E, provided with a slot or other means of attachment to the crutch, and with an accessible end or handle $q'$, combined and arranged with the rod of a pendulum in such manner that the said beat-arm may be used to shift the relation of the crutch to the pendulum-rod and put the clock in beat, substantially as specified.

17. A beat-arm E, provided with means of attachment to a pendulum-rod, and means for engaging with a suspending-spring, substantially as specified.

18. A beat-arm of a pendulum, in combination with the rod and with a pendulum-ball hinged thereto, such beat-arm provided with a projection or offset for limiting the motion of the ball, substantially as and for the purpose specified.

19. In combination, a pendulum-ball B, connected by joints to and combined with a compound rod composed of the double plate-frames A A, connected by pillars, as in the construction of clock-movements and made of a material of superior expansibility by heat, a central rod $a$ of inferior expansibility by heat, and a means of attachment directly or indirectly with the point of suspension of the pendulum, substantially as described.

20. In combination, a pendulum-ball B, connected by joints to and combined with a compound rod composed of the frames A A, of superior expansibility by heat, a rod $a$, of inferior expansibility by heat, an adjustable beat-arm E, and means of attachment to the point of suspension of the pendulum, substantially as and for the purpose specified.

21. A compensating pendulum provided with compound bars acting to produce compensation for temperature, in which the two elements of the compound bar are extended and connect together above the point of suspension of the pendulum to obtain greater effective length of the compensating bars.

22. A table or plate $v$ for receiving regulating-weights and connected to the rod of the pendulum above the point of suspension, substantially as and for the purpose specified.

23. In a pendulum compensated by compound bars and a compensating lever and provided with a combined ball and integral lever, the combination and connection of the element of least expansibility by heat with the ball between the center of the same and the fulcrum of the integral lever, substantially as and for the purposes specified.

24. The combination of a pendulum-rod with its point of attachment to another portion of the pendulum through a ball or conical piece bearing in an opening adapted to receive the same, substantially as and for the purposes specified.

CHAS. E. EMERY.

Witnesses:
N. J. SPYKER,
GEORGE C. PENNELL.